March 10, 1964     C. ZARDI     3,124,795
WEIGHING MACHINE Filed July 24, 1961     7 Sheets-Sheet 1

Fig. 1

INVENTOR
BY Carlo Zardi
ATTORNEY

March 10, 1964

C. ZARDI 3,124,795

WEIGHING MACHINE

Filed July 24, 1961

INVENTOR.
BY Carlo Zardi

March 10, 1964  C. ZARDI  3,124,795
WEIGHING MACHINE

Filed July 24, 1961  7 Sheets-Sheet 3

INVENTOR.
BY Carl Zardi

INVENTOR.
BY Carl Zardi

United States Patent Office 3,124,795
Patented Mar. 10, 1964

3,124,795
WEIGHING MACHINE
Carlo Zardi, Milan, Italy, assignor to
Atoma S.p.A., Milan, Italy
Filed July 24, 1961, Ser. No. 126,256
Claims priority, application Italy July 28, 1960
5 Claims. (Cl. 340—347)

The present invention concerns a weighting machine, the indications of which are transmitted through an electronic circuit to an electric printing or recording device which effects the recording of the indications or data corresponding to the position reached by the indicator of the weighing machine, that is to say, the weight.

Various solutions for achieving this operation are known. One of them provides a series of fixed contacts spaced along the fixed scale or graduation member of the weighing machine. The displaceable indicator carries a contact which can be brought by means of electromagnets into engagement with anyone of said fixed contacts depending upon the position assumed from time to time by the indicator, so as to produce by way of an electric or electronic circuit, the actuation of electromagnets which control the recording or printing of the data. Such a solution, however, has a number of disadvantages. Above all, the contacts subject to mechanical engagement become worn and, in the case of sudden removal of the load placed on the scale, the indicator is bound to strike against the fixed contacts with the risk of breakage. Furthermore, the registrations are without that degree of accuracy which is desirable for certain purposes.

Another solution uses photo-cells co-operating with a rotary perforated disc. According to this solution the number of apertures in the disc passing by the photo-cells are counted and a recording is obtained of the indicated weight on the basis of the number of counted apertures. It is obvious that in the case of an error in counting, the recording of a weight value will also be wrong; what is much worse is that possibly no recording at all is obtained.

The object of the present invention is to overcome the above disadvantages and, more particularly, to construct a weighting machine of the type which furnishes a recording of the weight, without contacts co-operating between indicator and graduation member and therefore without the pertaining or resulting disadvantages; the invention also avoids the recording of incorrect indications in that the displacement of the indicator does not involve, as in the second of the above-mentioned solutions, a measurement of its deflections.

A further object of the present invention is to construct an novel electronic circuit which permits automatic control of the selection of the data received in the form of electric signals as well as also their storage and recording.

Another purpose of the present invention is to construct a weighing machine in which, by means of elements on a movable indicator and elements on a stationary scale member, an inductive coupling is achieved between such elements through with the signal is transmitted to the electronic control circuit.

Yet another object of the invention is to construct an electronic circuit which makes it possible to control successively, at first in one sequence and then in reverse sequence, a series of relays.

A further object of the invention is to construct an electronic circuit which takes into account, and corrects the effects of, unintentional displacements of the indicator of the weighing machine due, for example, to oscillations thereof, which may always occur even during the recording of the numerical values shown by the indicator.

According to the invention, on the indicator or other member rigidly connected thereto and therefore participating in its movement, there are mounted windings adapted to produce a magnetic field which affects a series of windings, each corresponding to a different weight to be indicated, respectively, in some of which there are induced, according to the position assumed by the indicator, signals which, through groups of amplifiers and selectors, are transferred to the recording members of the machine which are to mark down the weight shown by the indicator. According to a preferred embodiment of the invention, the windings mounted on the indicator or on the related member are inductively coupled with a multivibrator. Such inductive coupling may be effected for example, by electrically connecting a primary winding to the multi-vibrator and mounting it annularly around the indicator on the stationary structure of the weighing machine. The corresponding secondary winding, also annular, may be mounted on the rotatable axle of the movable indicator, and connected to the field generating windings present on the indicator which is provided with extensions constituting a magnetic core therefor with predetermined magnetic poles.

According to the invention such extensions or cores are combined with the series of windings which may be selectively exposed to said field which serves to produce therein the signal which, suitably amplified and processed in an electronic circuit, is transmitted to the recording member for stamping or printing the weight to be recorded. According to an important characteristic of the invention the sets of multiple windings distributed along the graduation or scale member comprise a series of windings electrically insulated from each other, each of which is connected to a different input of the electronic circuit.

In weighing, various weight unit systems may be used e.g. the metric system, in which the weight of an object may be defined in terms of a kilogram or multiple thereof and additionally (or exclusively if the weight is less than one kilogram) by decimal fractions of a kilogram, e.g. hectograms, dekagrams or grams. In the metric as well as any other weight unit system referred to in this application, the largest unit to be used in weighing, e.g., kilogram, will be called the main category of the weight unit system employed, and the smaller fractional units, e.g. hectograms, a certain multiple of which, e.g. ten, constitutes a unit of the main category, will be called a sub-category.

In the special case where the weighing machine is designed to weigh a maximum of 10 kilograms and the scale along a stationary reference member is subdivided into kilograms and hectograms, i.e. multiples of the main category and at least one sub-category of the weight unit system employed, a first winding is provided including a number of turns each of which is spaced from the following and from the preceding one a distance which corresponds on the scale to the difference of one kilogram, the first of these turns being aligned with the area of said scale assigned to zero kilogram, i.e. at the lower end of said scale. A signal indicating a main category unit or zero sub-category units will be generated in one or the other of said turns, respectively, when the core extensions of the indicator are in a position opposite the respective turn. A group of similar windings or coils is provided for producing signals representing units of the sub-category, e.g. hectograms, in the present example there being nine such additional windings because ten hectograms constitute one kilogram. Each of these similar windings is assigned to a different number of sub-category units, e.g. hectograms, ranging from 1 to 9 hectograms. However, each winding comprises a plurality of turns, these turns being spaced from each other equally a distance which corresponds on the scale to the difference of one kilogram. The number of turns in each of the first and similar windings corresponds to the maximum number of main category units, e.g. kilograms to be handled by the weighing machine, i.e. ten in the present example. All said windings are therefore identical but arranged along the scale or stationary reference member relatively offset against each other a distance corresponding on the scale to one hectogram difference. Evidently the signals produced in said turns of said windings serve to indicate the decimal fractions or hectograms within any one kilogram range.

A second type of windings is provided for producing signals indicating kilograms. These other windings are each associated with a different area of the scale, the length of each such area being slightly greater than the length along the scale corresponding to one kilogram. In this way, 10 independent windings of this second type are provided which, when exposed to the magnetic field produced by the indicator, can produce a signal which controls the stamping or printing of the numerical recording of the kilogram values depending upon the position assumed by the indicator.

In this way, in every position of the field produced by the magnetization of the cores mounted for example on the indicator, signals will be generated in one of the first windings associated with hectogram values, and in that one of the second type windings which is associated with the weighed kilogram value which encompasses the signal-indicated hectogram, which signals will be preamplified in the weighing machine itself, to be transmitted then to the inputs of other circuits in which said signals are further processed and finally transmitted to the stamping or printing member of the recording device.

The invention will be more clearly understood from the following detailed description (which is provided purely by way of example and is therefore not a limitation) of its particular forms of construction relating to a weighing machine weighing a maximum of 10 kilograms, but it must be clearly understood that the maximum weight may be changed without departing from the scope of the invention. Such a weighing machine and the pertaining circuits are illustrated in the accompanying drawings, in which:

Figure 1:
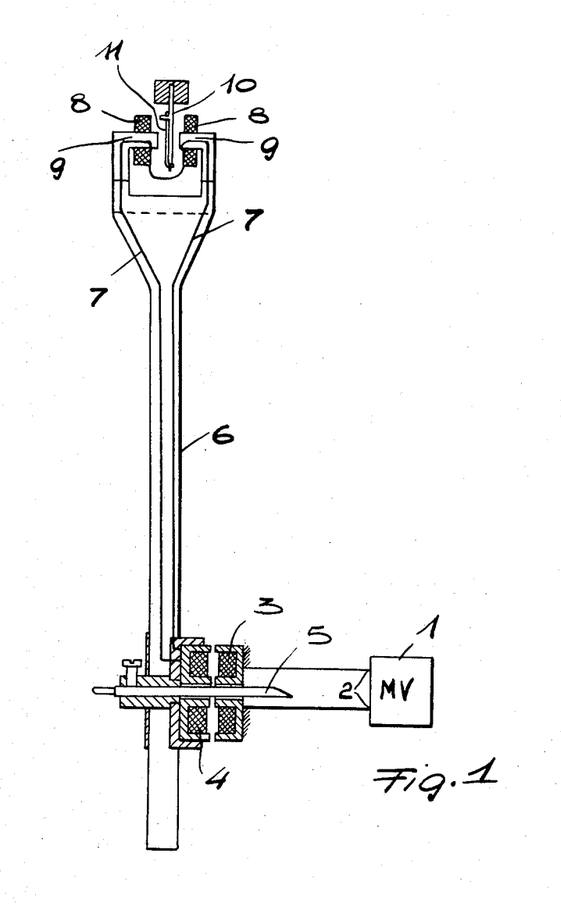
FIG. 1 shows diagrammatically, in a partly sectional elevation, the movable indicator of the weighing machine with an inductive coupling which serves to feed the windings provided on the indicator and inducing a signal in stationary windings arranged along the scale or reference member of the machine.

With reference to the drawings and in particular to FIG. 1, a conventional multi-vibrator 1 feeds, through leads 2, and annular primary winding 3 mounted in any suitable manner on the stationary structure of the weighing apparatus and disposed concentrically relative to the shaft 5 of the indicator 6 of the machine. In front of or opposite to the primary winding 3 is disposed a secondary winding 4, also concentric to the rotatable shaft 5 of the indicator 6. The secondary winding 4 is rigidly mounted on the indicator 6 so as to rotate therewith. The shaft 5 is supported for rotation by generally known means which require no further description or illustration.

The secondary 4 is electrically connected through the conductors 7 to a pair of windings 8 connected in series with each other and with winding 4 and mounted on the magnetic core extensions 9 of the indicator 6.

Figure 2:
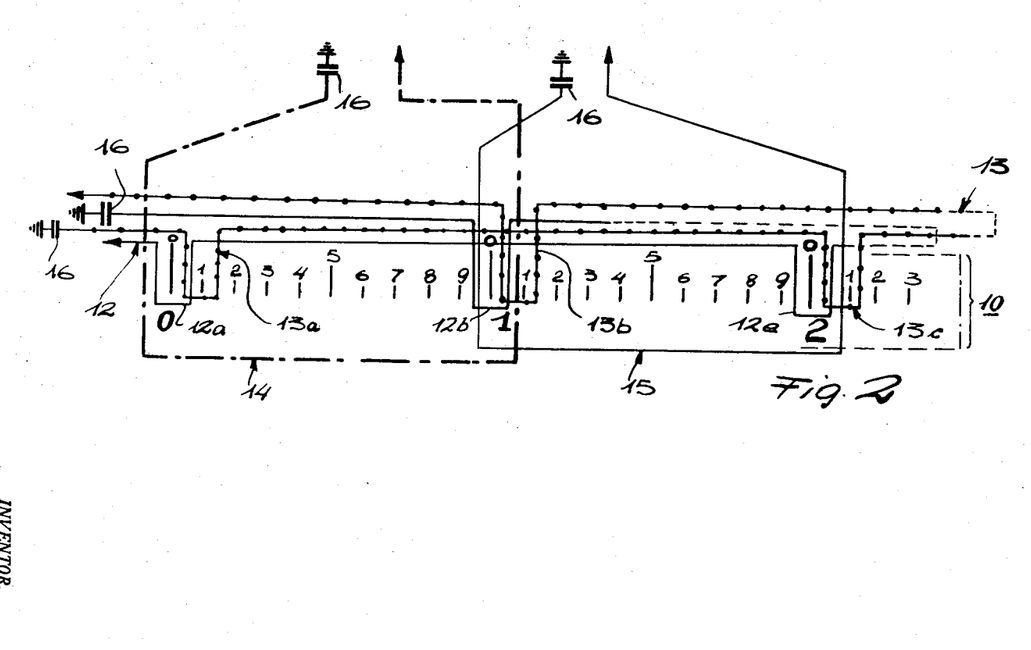
FIG. 2 shows a partial diagrammatic detail of some of the stationary windings, assuming that the scale of the machine is rectilinear instead of curved.
Figure 3:
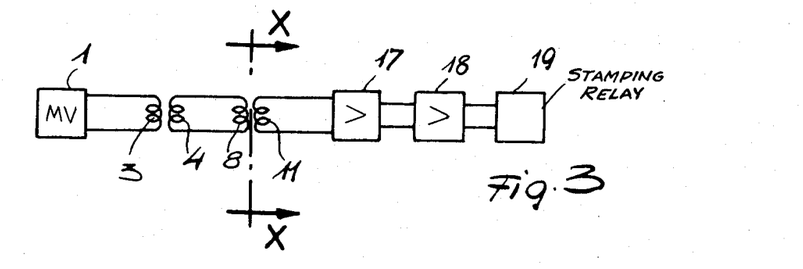
FIG. 3 is a block diagram of the electrical units or main components of the weighing apparatus.
Figure 4:
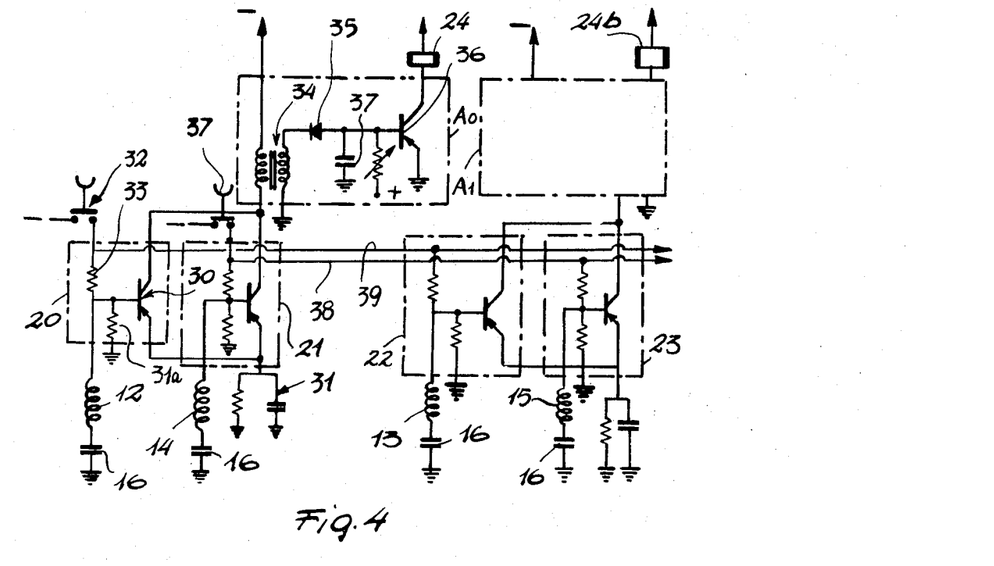
FIG. 4 illustrates diagrammatically a first embodiment of the invention, namely an electronic circuit which serves to amplify the signals produced in the stationary windings along the scale of the machine and to effect the stamping or printing of the indication which corresponds to a particular position assumed by the indicator.

The field generated by said windings 8 extends through a non-conductive scale member 10 interposed between the pair of cores 9, and supporting sets of multiple windings symbolized by 11 which also in FIG. 3 are shown as a unit 11, the details of which however, even though only partially, may be seen from FIGS. 2 and 4.

With reference to FIG. 2 in which, for reasons of clarity, the scale or graduation member 10 of the machine is shown rectilinearly instead of circularly, it will be noted that said scale is sub-divided in decimals, for example, in kilograms and hectograms, the kilograms being obviously indicated by the longer graduation lines, and the hectograms by the shorter graduation lines.

As already stated, the scale member 10 is provided with sets of multiple windings 11, composed, that is to say, of a series of mutually electrically insulated windings as 12, 13, 14, 15 (FIGS. 2 and 4), connected to various inputs of the electronic circuit which will be described hereinafter.

In this specific case, in which by way of example the weighing machine weighs up to a maximum of 10 kilograms and in which the scale thereof is sub-divided into hectograms and kilograms, a first winding 12 is provided having a series of turns (10 to be precise) indicated by 12a, 12b, 12e and so on, but only some of which are shown in FIG. 2 for reasons of clarity. Each of these turns is spaced from the following and the preceding one a distance corresponding, measured along the scale of the machine, to the difference of one kilogram. The first turn of such winding, i.e., the turn indicated by 12a, is provided at the scale area 0, that is to say, at the beginning of the scale. The second turn 12b will therefore be disposed opposite the kilogram index "1," the third opposite the kilogram index "2" and so on, in other words, opposite those points on the scale, respectively, which correspond to zero indication for the hectograms.

The scale shown in FIG. 2 is also provided with another winding of the same type as the preceding one such as, for example, those indicated as a whole by 13 and provided with a series of turns 13a, 13b, 13c and so on. In this case also the distance between the turns 13a, 13b, 13c, etc. corresponds to the difference of 1 kilogram on the scale, with the only difference that the first turn 13a is disposed in the scale area assigned to the first hectogram or hectogram "1."

In a similar manner additional eight windings of the same type (not shown) are provided for the other hectogram values with turns spaced apart corresponding to the difference of one kilogram, but with the first turn of each of these other windings displaced approximately a distance corresponding to one hectogram difference on the scale from that of the preceding winding.

There is therefore a total of 10 windings of this first type, each having 10 turns distributed along the scale of the weighing machine in the above manner.

It obviously follows from the above that, whenever the cores 9 are located opposite one of said turns, there is induced in the latter a signal which corresponds to the weight associated with the particular turn and depending upon the position assumed by the indicator along the scale i.e. to the measured weight.

On the scale member 10 of the weighing machine there is also provided a second series of 10 windings of a second type, each of which encompasses by its single turn a different longitudinal area of the scale, in size slightly greater than the length corresponding to a difference of one kilogram. In FIG. 2, there are shown only two of such windings of the second type, indicated respectively by 14 and 15.

Each of these windings more precisely encompasses by its single turn the areas of the scale which correspond respectively, to unit values 0, 1, 2, 3, and so on of the kilograms, as is clearly apparent from FIG. 2.

All the windings 12–15 described above are connected at one end to earth through a condenser 16. Each of the other ends is connected to the base of a transistor e.g. 30 of a pre-amplifier 20 as shown in FIG. 4.

Reference will now be made to the remaining figures of the drawing and, for easier understanding of the invention, the block diagram of FIG. 5 will first be described for explaining, in a simplified manner, the operation of the apparatus according to the invention.

In FIG. 1, the multi-vibrator 1 feeds the primary 3 mounted around the shaft 5 of the indicator 6, 4 is the secondary inductively coupled with primary 3. Said secondary 4 feeds the windings 8 which are present on the cores 9 at the end of the indicator 6 and may induce depending upon the position of indicator 6 a signal in any one of the windings summarily shown at 11 and distributed along the scale member 10 of the weighing machine. The signal induced in any of the group of windings 11 which, in a given position of the indicator are influenced by the field between the cores 9, reaches (as shown in FIG. 3) a pre-amplifier group 17 provided in the weighing machine itself so as to reach then, amplified, a current amplifier 18 and from there the relays 19 which cause the stamping or printing of the weight indications corresponding to the position assumed by the indicator 6.

The block diagram of FIG. 3 may be regarded as constituting one simple embodiment of the invention and the illustration of FIG. 4 correspond to the circuit portion at the right of the section line X—X in the circuit diagram of FIG. 3. In FIG. 4 are diagrammatically shown the windings 12, 13, 14 and 15 which constitute together the set 11 of FIGS. 1 and 3, and of which winding 12 is associated with hectogram value 0, that is to say, with the hectogram values 0 which coincide with the indications of exactly 0, 1, 2, 3, 4, 5, 6, 7, 8, 9 kilograms, respectively, on the scale of the weighing machine; winding 13 is associated with hectogram value "1," that is to say with the hectogram values "1" which would coincide with the indications of 0.1 kg., 1.1 kg., 3.1 kg., 4.1 kg. and so forth on the scale; winding 14 is associated with the kilogram value "0" which is the first kilogram range of the scale; and finally winding 15 is associated with the kilogram value "1" which is the second kilogram range which is encountered by the indicator when moving up from the beginning of the scale. Other windings of the first type as 12 and 13 and of the second type like 14, 15 would be associated analogously with other hectogram and kilogram values, respectively.

Each of the stationary windings distributed along the scale of the weighing machine is connected at one end to its respectively own pre-amplifier group. There will therefore be a total of 20 pre-amplifier groups, only four of which 20, 21, 22 and 23, are illustrated in FIG. 4 for reasons of clarity. In particular, the pre-amplifier groups are connected in parallel pairs each forming a group, as may be seen from the groups 20, 21 and 22, 23. The parallel arrangement is provided on account of the fact that the numerical indications, for example, 0, and 1, 2, and so forth are common both to the hectograms and the kilograms, and it is therefore sufficient to have only one current amplifier group for the windings which are associated with the same numerical indications of hectograms and kilograms. Th signal issues from such groups, duly amplified, to control, for example, the stamping or printing relays of the recording device. The current amplifier groups, therefore provided in the number of 10, are indicated respectively by A0, A1, A2 and so on in FIGS. 4 and 5 and the relays of the stamping or printing device by 24a, 24b, and so on in FIG. 4.

The pre-amplifier circuits, for example of conventional transistor amplifiers in Class A, are all identical, and therefore it may be stated of the current amplifier groups A0, A1, A2 and so forth, which are described below, that reference to only one of them will suffice also for the remainder.

Assuming that the indicator 6 indicates the value 0.0 kg. i.e. is in position at the beginning of the scale: in this case, signals will be induced in both the windings 12 and 14. The hectogram representing signal induced in 12 is applied to the base of the transistor 30, the emitter of which is earthed through the parallel resistor condenser circuit 31 and the base of which is also connected to earth through the resistor 31a. If a negative potential, for example, by depressing the push-button switch 32, is applied through the resistor 33 to the base of the transistor 30, the transistor is unblocked and permits the passage of the signal to the transformer 34 of the amplifier group A0, which signal reaches through a diode 35 the base of the transistor 36, the emitter of which is connected to earth. The amplified signal issuing from A0 then reaches the relay 24a which may, for example, cause directly, upon its energization, the stamping or printing of the value 0. If, as assumed, the indicator is at the bottom of the scale, that is to say, in a position corresponding to the value zero, the electromagnetic field applied to the turn 12a of winding 12 associated with the hectogram "0" will therefore influence also the winding 14. In view of this, the winding 14 receives a kilogram representing signal which is transmitted suitably amplified through the pre-amplifier 21 (as a whole similar to that indicated by 20) if there is applied to the base of the transistor of 21 a negative potential through depression of the push button switch 37. The thus pre-amplified second signal also passes through the transformer 34, the diode 35 and reaches the transistor 36 and thence the relay 24a which controls the printing of the value "0." In practice, since the recording device first prints or stamps the value which is of the higher category of weight units (in this case kilograms) the push button switch 37 must first be depressed and then, after the stamping recording of the corresponding kilogram value has been obtained, push button switch 32 is depressed.

Preferably, by depressing the push button switches 32 or 37, a negative potential is applied to the bases of all the transistors of the pre-amplifiers associated with the kilograms and the hectograms, respectively, this arrangement requiring only two push button switches to control the recording of all weight indications. For such purpose the bases of all transistors of the pre-amplifiers are connected to two common conductors 38 and 39, respectively. To complement what has been described above it may be added that the parallel RC-circuit 31 serves to block one of the pre-amplifiers, for example 21, when the other 20 is in operation.

Another embodiment, rather more elaborate but which also uses pre-amplifiers 20, 21, 22, 23 and so forth, is illustrated in the remaining figures of the drawings.

The latter embodiment makes it possible to render automatic the recording of the value indicated by the indicator and entails a number of advantages beyond to those of the above described first embodiment. This second embodiment also concerns a weighing machine weighing up to a maximum of 10 kilograms with sub-division into kilograms and hectograms and with windings 11 disposed as described above, with reference to FIGS. 1 and 2.

To understand fully the necessity which led to the development of this more elaborate embodiment, it is advisable to consider the following matters.

The magnetic field produced by the magnetization of the cores 9 is not limited to influencing in certain indicator positions only one turn of the stationary windings associated with hectograms and kilograms, respectively, namely precisely the one which corresponds to the exact position of the indicator along the scale, but it will influence also the adjacent turns all the more since, to avoid the risk of not obtaining any signal, the adjacent turns are partly overlapping. As will be seen in fact from FIG. 2, each turn is not limited to occupying individually alone a given area of the scale 10 but each extends somewhat into the zones where other turns are influenced. Thus, e.g., the turn 15 associated with the kilogram value "1" which should extend from the mark "1" to "2" of the scale, extends beyond such values and therefore into part of the scale area of the kilogram ".9" and part of the scale area of kilogram "2.1." In view of this, when the magnetic field produced by the cores 9 of the indicator 6, is near an end of the area e.g. that assigned to a scale kilogram value "1" it induces a signal both in the winding 15 assigned to the kilogram value "1" and in the winding 14 assigned to the kilogram value "0." It is therefore necessary to discriminate between the two values as to which is in fact to be printed.

The same problem appears clearly in the case of the overlapping turns 12a, 13a or 12b, 13b or 12c, 13c of the winding 12, 13, etc. assigned to hectogram values where, the field of the cores 9 influences in each indicator position a plurality of said turns.

The problem concerning the exact printing of the correct kilogram value is solved on the basis on the following considerations. Assuming that the indicator 6 is in such position as to influence two adjacent windings, for example, the windings 14 and 15, i.e. those assigned to the kilogram value "0" and to the kilogram value "1," respectively, the correct one of the numerical values "1" and "0" may be printed on the basis of the number of the hectograms indicated by the indicator in the particular position. In fact if the indicator produces a signal representing a value of the hectograms ranging between "5" and "9," the lower value will have to be printed for the kilograms, that is to say, the kilogram value "0" it being obvious that, the indicator being in the marginal area between the kilogram "0" and the kilogram "1," the correct kilogram indication which corresponds to the indicated number of hectograms equal to or greater than "5," will be that of the kilogram value "0." If instead the number of the hectograms is between the value "0" and the value "4" the kilogram value "1" will have to be printed.

To carry out such an operation of discrimination, which makes it possible to select the correct kilogram value there is provided according to the invention a suitable circuit which will be described hereinafter, which makes it possible to "remember" the indicated value of the hectograms and to pre-determine the printing of the correct kilogram value.

The second problem, that is to say the one which relates to the selection of the actually indicated hectogram is solved by causing the signal to be selected and "remembered" to correspond to that issued by the last winding assigned to hectograms which has been influenced by the magnetic field. Thus, whenever the field would influence e.g. the turns of the windings associated with the hectogram values "1," "2" and "3" simultaneously, the value "3" will be selected and "remembered." This is obtained, according to the invention, by offsetting of the cores 9 with respect to indicating point of the indicator of the weighing machine, by an increase in the size of the turns of the windings assigned to hectograms and by providing an arrangement of contacts for selecting the last value represented by signal caused by the field while "cancelling" the other values.

From the above consideration it will be clear that in the method of operating the circuit which is assumed only by way of example to be applied to a weighing machine weighing up to a maximum of 10 kilograms with sub-division of the scale into hectograms and kilograms three operations must be considered which occur in succession, each of which is sub-divided into three distinct phases which also succeed each other in time.

The first of these operations will comprise the reading, identification of the correct hectogram value and memorising or remembering such hectogram value. In other words, the said first operation comprises of a first phase of reading the hectograms corresponding to the transmission of the signals appearing at the inputs of the pre-amplifiers such as 20, 22 etc. mounted in the weighing machine, by means of a completely automatic operation, but on the whole corresponding to the operation of depressing the push button switch 32. Such first operation also comprises a second phase in which between the various signals corresponding to hectogram values that signal is selected which in fact corresponds to the correct value, and a third phase, the phase of "remembering" or "memorising" in which the indication selected in the second phase is stored for pre-determining the correct selection of the kilogram value which selection is effected in a second operation as described hereinafter.

This first operation is followed by a reading, identification and recording of the correct kilogram value that is to say, of the kilogram value which is in fact indicated by the indicator, which second operation comprises the phases of reading the values which appear as signals at the inputs of the pre-amplifiers for the kilogram signals (for example 21, 23), this phase corresponding to the operation of depressing the push button 37 and automatically selecting the kilogram value pre-selected on the basis of the foregoing "memorising" of the value of the hectogram indicated by the recording indicator of the kilogram.

This is followed by the third operation consisting of the re-reading of the hectograms, in the re-identification and recording of the correct weight value.

This being said, the three operations mentioned above will now be described with reference to the circuits in FIGS. 5 to 11. In the course of such particular description the construction of said circuits will also be explained.

At this point it is suitable to briefly refer to a few aspects of the circuit components which control the succession or sequence of the three operations and of the respective phases thereof.

For this purpose reference will be made first to FIGS. 6, 7 and 8.

Figure 6:
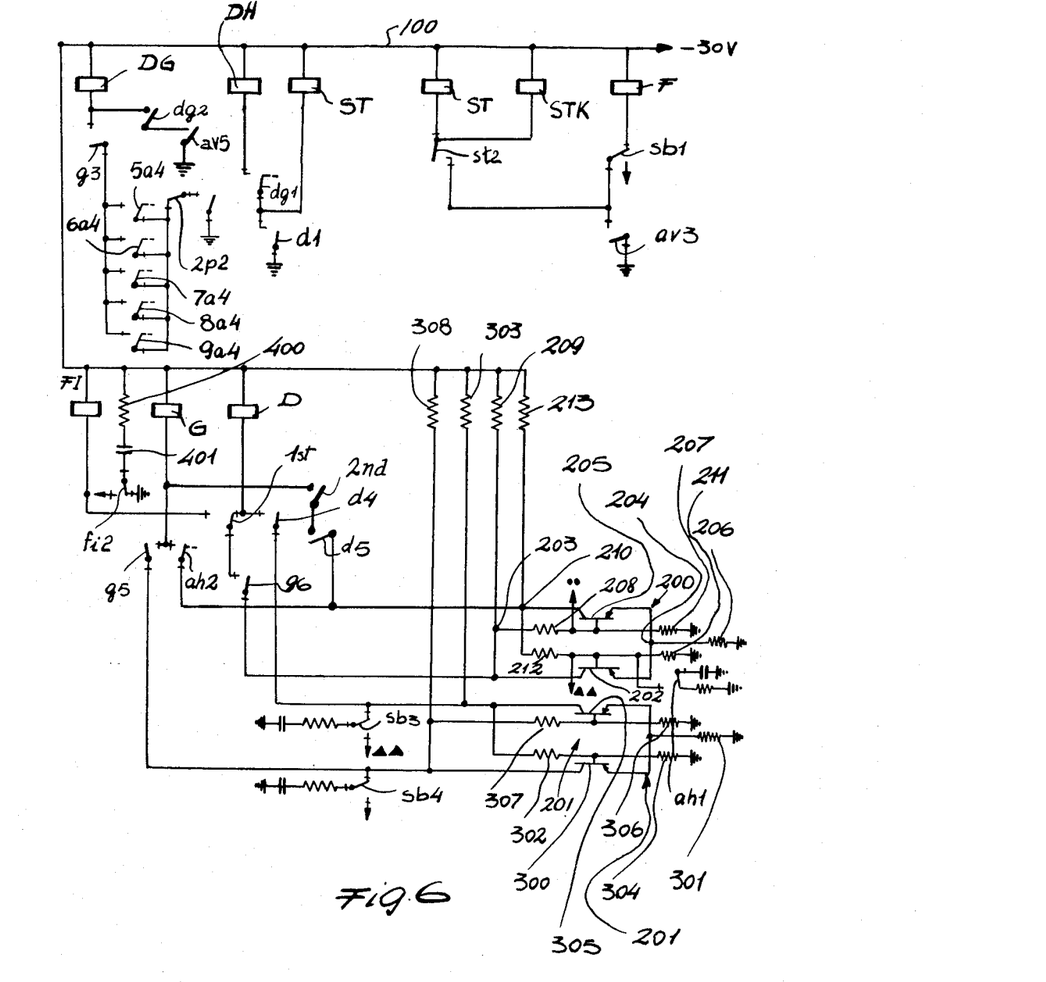
FIG. 6, which is to be read in connection with FIGS. 7 and 9 illustrates a detail of the circuit arrangement of the weighing machine which makes it possible to feed, first in one sequence and then in reverse sequence, a series of control relays.

Each of the three operations, which follow each other, begins with excitation of a relay (G, D in FIG. 6). Excitation of such relays is first controlled in direct sequence (G and D) and then in the reverse sequence (D and G) by a bi-stable circuit and transistor (see FIG. 6). The three phases of each operation, which are also consecutive, begin with the dropping off of three interdependent delayed action relays (relays 1P, 2P and 3P, see FIG. 7), that is to say, the dropping-off of one starts the dropping-off of the next, as apparent from the time diagram shown in FIG. 8, in which each continuous line represents the excited condition of the relay and the broken lines the dropping-off delay, whilst the absence of any sign shows the relay in its inoperative condition.

All this being said, the first of the operations mentioned above will be described, assuming by way of example that the position of the indicator of the weighing machine indicates 7 kilograms and 8 hectograms and that the magnetic flux induces a signal in the windings assigned to the hectogram values "6," "7" and "8" and in the windings relating to the kilogram values "7" and "8."

Figure 7:
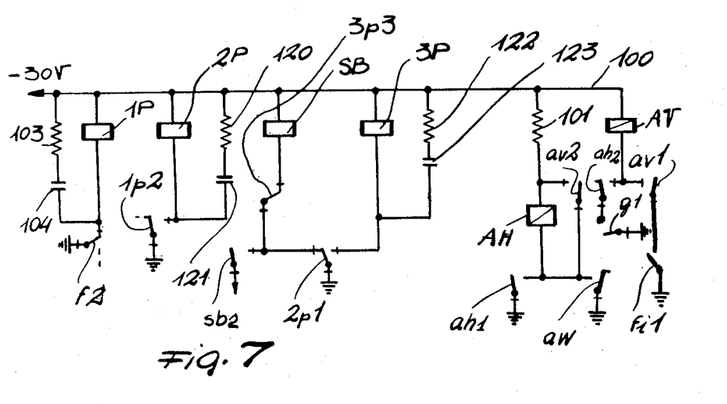
FIG. 7 shows another detail of a circuit arrangement of the weighing machine, i.e. a series of relays having delayed action release and the starting and stopping relays.

Now, it is presumed that the push button $aw$ has been depressed (FIG. 7). Such a closure effects excitation of the relay AH which remains excited through its own self-holding contact $ah1$ even after the push button $aw$ has been released. The relay AH is fed by a —30 volt lead, indicated by 100, through the resistor 101. Such excitation causes the closing of the normally open contact $ah2$ of said relay which excites the starter relay AV through the normally open contact $g1$ of the relay G (FIG. 6), the excitation of which is caused by the aforementioned bi-stable circuit, provided with the reference 200, 201 (see FIG. 6) which produces excitation of said relay. The details of said bi-stable circuit will be explained in the course of the description. The relay AV is maintained therefore excited by being connected on the one hand to earth and on the other hand to the —30 volt lead 100.

Excitation of the relay AV effects the closing of its self-holding contact $av1$ and of its other contact $av2$ which, short-circuiting the relay AH, causes the latter to drop off.

Excitation of the relay AV also causes the closing of its contact $av3$ (see FIG. 6) which connects to earth the relay F, the other end of which is connected to the —30 volt lead 100. Such an earth connection is effected through the normally closed contact $sb1$ of a blocking relay SB which will be described hereinafter.

Due to this fact the relay F is excited and effects closure of its contact $f1$ (FIG. 9) thus establishing a part of a circuit which constitutes the equivalent of the push buttons 32 and 37 in FIG. 4.

Figure 9:
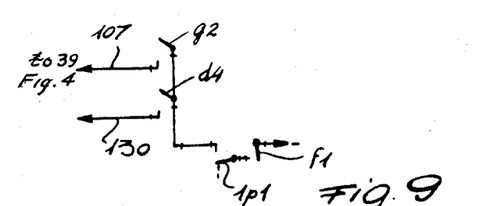
FIG. 9 is a detail of the circuit arrangement which makes it possible to apply to the input lines of FIG. 5 the signals induced in the stationary windings arranged along the scale of the weighing machine.

Assuming now that the relay G is excited, the normally open contact $g2$ disposed in series with the contact $f1$ will also be closed.

The contact $1p1$ is also closed, because the normally closed contact $f2$ of the relay F (FIG. 7) having opened, and the relay 1P, to which said contact $1p1$ appertains, will not yet have dropped off due to the retarding circuit represented by the resistor 103 and by the condenser 104 disposed in series and in parallel with such relay. The begining of the deenergization of the relay 1P takes place at the moment when the relay F is excited and the contact $f2$ opens (see points 105 and 106 in FIG. 8).

With the closure of the contacts $f1$, $1p1$, $g2$, the lead 107 which is connected to the common voltage supply lead 39 of FIG. 4, is subjected to negative potential. The negative potential is then applied to the base of the transistors which form part of the preamplifiers, but assigned to the hectogram values 6, 7 and 8 and constructed exactly like those indicated by 20 and 22 in FIG. 4.

Figure 5:
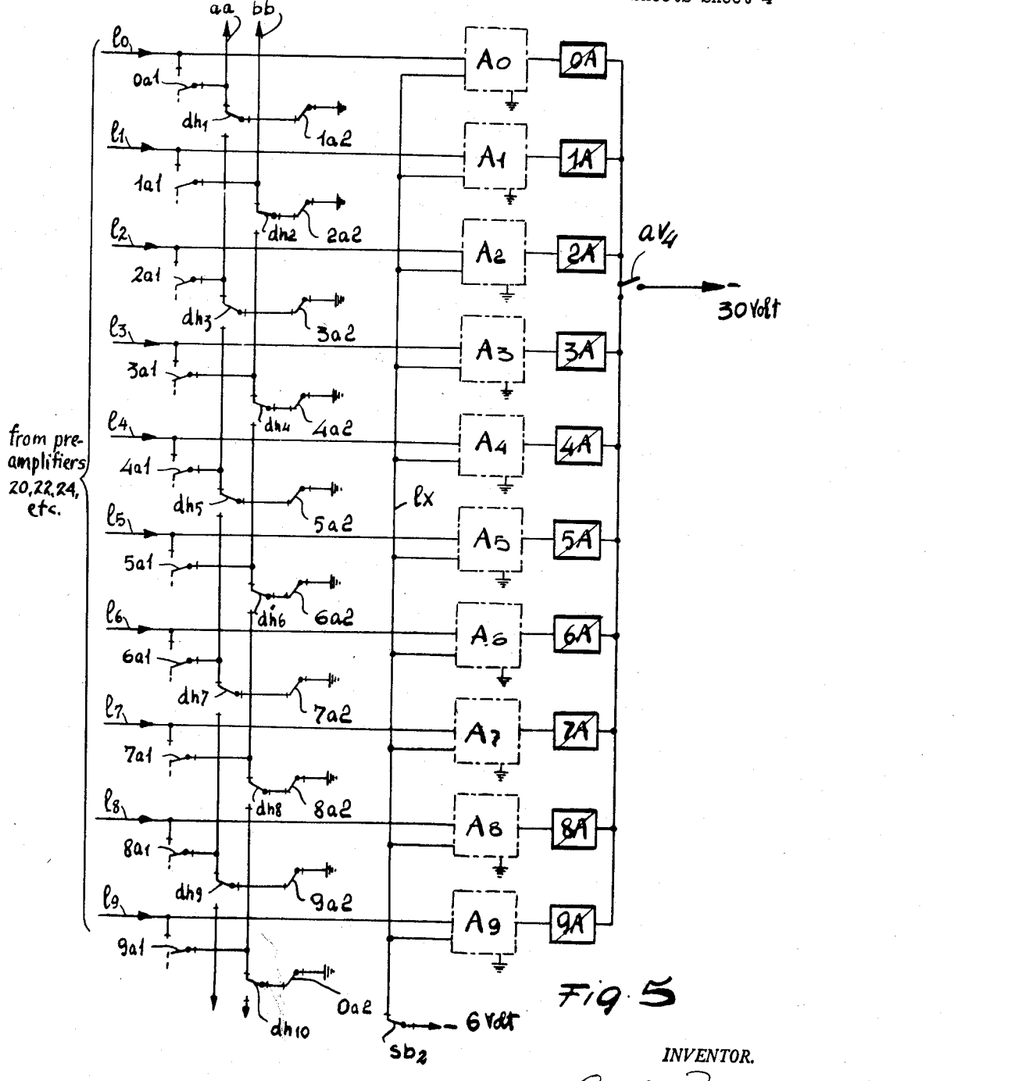
FIG. 5 shows part of another circuit arrangement of the weighing machine, i.e. the part which comprises to the amplifier groups for amplifying the signals appearing at their inputs.

In consequence of this, the leads $1_6$, $1_7$ and $1_8$ of FIG. 5 to which the pre-amplifiers of type 20, 21, 22, and 23 and so on are connected carry signals which cause the activation of the monostable circuits constituted for example by the conventional weighing machine oscillator, but absolutely equivalent to the amplifier groups A0, A1 etc. of FIG. 4 and therefore indicated in FIG. 5 by the same reference numerals.

As will be seen from FIG. 5, ten input lead $1_0$, $1_1$, $1_2$, ... $1_9$ are provided which extend directly to the amplifier group A0, A1 etc. which feed by their output the 10 relays 0A, 1A, 2A, 3A and so on, the circuit of which is completed by a —30 volt lead through the contact $av4$ of the relay AV. The groups A0, A1, A2 are all connected to a common lead $1x$ which, through the normally closed contact $sb1$ of the relay SB (FIG. 7) are connected to a source of negative potential (—6 volts) for example. In particular the lead $1x$ and the various branches which connect it to the groups A0, A1 extend to the bases of the transistors (not shown) which are part of these amplifier groups.

A pair of bus bar leads $aa$ and $bb$ are also provided which may be connected by an arrangement of relay contacts to earth or to the input leads $1_0$, $1_1$ etc. ... $1_9$. These contacts are controlled by the relays 0A, 1A, 2A. The contacts controlled by said different relays are indicated by the same reference character as the respective relay, but with a small letter and the addition of a number. Furthermore, the description which will be given of the positioning of some of said contacts will make it possible to understand the operation of the entire system.

Continuing the aforementioned considerations, the application of the signal to the lead $1_6$ effects excitation of the relay 6A. This causes closing of its normally open contact $6a1$ which connects the lead $1_6$ to earth through the contacts $dh7$ and $7a2$. By the fact however that in the meanwhile, through the existence of a similar signal on the lead $1_7$, the relay A7 is also excited, the normally closed contact $7a2$ opens and therefore de-energisation of the relay A6 occurs. Also the relay 7A becomes de-energised in view of the fact that excitation of the relay A8 due to the presence of the signal on the lead $1_8$, effects opening of the normally close contact $8a2$ and therefore interrupts the circuit which connects the lead $1_7$ to earth through the contacts $7a1$, $dh8$, and $8a2$. The relay 8A however remains excited, since no signal appears on the lead $1_9$ (hence the normally closed contact $9a2$ remains in the position shown in the figure) and since consequently, positive potential is applied via the lead $1_8$ to $A_8$.

This concludes the second phase of the operation, which concerns the selection of the correct hectogram value, that is to say of the hectogram value which is in fact visibly indicated by the present position of the indicator of the weighing machine.

The first phase of said operation on the other hand is concluded with the connection of the lead 107 to negative potential (see FIG. 9). In other words, the first phase of the operation has lasted from the moment in which the relay F is excited and 1P is consequently de-energised (see points 105 and 106 in the diagram shown in FIG. 8) and concludes at the point 110 of the diagram in which the relay 1P drops off, causes the beginning of the dropping off point 111 of the relay 2P. The second phase starts at the point 111 with the de-energization of the relay 2P and concludes at the point 112, that is at the moment when the dropping-off of the relay 2P produces de-energisation of the relay 3P (see point 113). The third phase of the process, that of memorising, will now be described and begins with the de-energization of the relay 3P, that is to say at 113 and terminates at 114 with excitation of the relay SB, the excitation of which starts at 115 the second operation which terminates with the recording of the kilogram value indicated by the present position of the indicator of the weighing machine.

Figure 8:
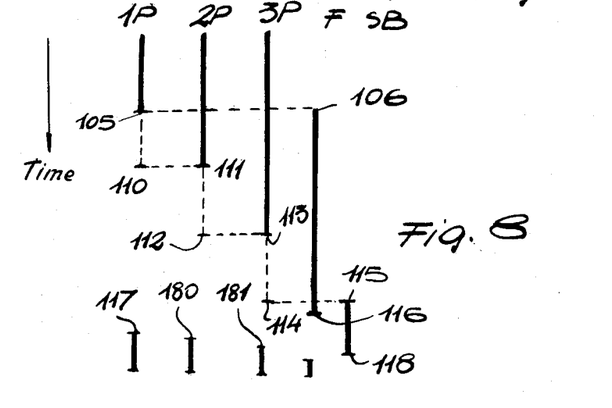
FIG. 8 is a diagram of the time relations between the actions of the delayed relays shown in FIG. 7.

In particular, at the point 110 in the diagram of FIG. 8 the relay 1P is deenergized and causes movement of its contacts 1p1, 1p2 and so on to the position shown in the drawing. The opening of the contact 1p2 corresponds to the moment 111 in which the relay 2P is switched off but and still remains enerized due to the delay circuit represented by the resistor 120 and by the condenser 121 arranged in series or in parallel with the relay 2P. With dropping-off of the relay 1P, the normally open contact 1p1 opens and thus the lead 107 is no longer connected to a negative potential, and therefore the pre-amplifier groups (see FIG. 4) are no longer conductive.

The dropping-off of the relay 2P at the point 112 starts, as already stated, the third phase of the first operation, i.e. the phase of memorising the hectogram value indicated by the indicator which in this case is the hectogram value "8."

At the point 113 the contact 2p1 of the relay 2P is brought to the position shown in FIG. 7 and the de-enerization begins of the relay 3P connected in parallel to its delay circuit formed by the resistor 122 and by the condenser 123 in series therewith. During the phase of delayed deenerization which is from the point 113 to the point 114 of FIG. 8 the memorising or remembering phase begins. In fact excitation of the relay DG begins since the contact 3p2 is kept closed (the relay 3P not being yet de-energized) and the normally closed contact 2p2 is closed, the relay 2P being deenergized. By the excitation of the relay 8A, the closing of the contact 3a4 is effected which forms part of a series of 5 normally open contacts 5a4, 6a4, 7a4, 8a4, 9a4 arranged in parallel and associated respectively with the relays A5, A6, A7, A8 and A9 and associated with the hectogram values "5," "6," "7," "8" and "9," respectively.

Excitation of the relay DG effects the closing of the normally open contact dg1 located in series with the relay DH which is fed by the —30 volt supply lead, indicated by 100. The relay DG remains excited through its holding contact dg2 and the contact av5 of the starter relay. There remains in fact a connection to earth through the relay DG even when the contact 3p2, at the conclusion of the third phase of the first operation, completes its dropping-off at the point 114 (see FIGS. 6 and 8).

At point 114 of the diagram FIG. 8, the contact 3p3 of relay 3p (FIG. 7) moves to the position as shown and causes excitation of the so-called blocking relay SB through the contact 2p1. The relay SB then remains excited through the holding contact sb2. Excitation of the relay SB causes the de-energisation of the relay 8A (see FIG. 5) by the opening of its contact sb2 which connects the lead 1x to a negative potential; it also causes, through its two contacts sb3 and sb4 (FIG. 6) excitation of the relay D in a manner which will be described in greater detail hereinafter.

This concludes the first operation and the second begins immediately thereafter and consists in the phases of reading, identification and recording of the kilogram value actually indicated by the position of the indicator of the weighing machine.

*Operation of Reading, Identification and Recording of the Appropriate Kilogram Value, Indicated by the Indicator*

As a result of the excitation of the relay SB the normally closed contact sb1 opens and hence the relay F is de-energised. The de-energisation of the relay F entails the return of its normally closed contact f2 (see FIG. 7) to closed position in the circuit of 1P, thus causing excitation of said relay (see point indicated by 117 in the diagram in FIG. 8) in which the point of deenergization of the relay F is indicated by 116). Excitation of the relay 1P produces successively that of the relays 2P and 3P. If, as already stated above, the relay D (FIG. 6) is excited, its normally open contact d1 is closed and connects to earth the relay DH through the contact dg1 which is in closed position, the relay DG being still excited through the contacts av5 and dg2. Excitation of the relay DH also causes the switching of all its contacts dh1 to dh10 (see FIG. 5).

At the same time by the effect of the excitation of the relays 1P, 2P and 3P, the blocking relay SB is de-energised by the opening of the contact 3p3 of the relay 3P to which corresponds the point 118 of the time diagram shown in FIG. 8. De-energisation of the relay involves excitation of the relay F whereby, with reference to FIG. 9, the contact f1 is closed.

The contact 1p1 is also closed, as also is the contact d4. The closing of the three contacts applies to the lead 130 a negative potential and therefore causes on the leads $1_7$ and $1_8$ the signal to appear which comes from the pre-amplifiers and corresponds to the inductive coupling of the magnetic field of the polar extensions 9 of the indicator member 7 with the turn of the coil system 11 which are assigned to the kilogram value "7" and the kilogram value "8." The two signals which appear on the leads $1_7$ and $1_8$ influence the mono-stabilised circuits A7 and A8 and produce excitation of the relays 7a and 8a. In consequence, however, of the switching to second position of the contacts $dh_1$ to $dh_{10}$, the relay 8A does not remain excited because the lead $1_8$ is not earthed. On the other hand, the relay 7A remains excited because the lead $1_7$ is earthed through the contact 7a1, the contact dh6 and the contact 6a2.

This concludes the second phase of the second operation, that is to say, the phase of identification of the correct kilogram value, which phase occurs in the interval between the points 111 and 112 of FIG. 8, whilst the first phase of reading is completed in the time interval 105, 110 of the same figure. Excitation also of the relay D effects the closing of the normally open contact d1 and therefore the earthing of the relay ST of FIG. 6. The relay ST displaces its contacts st, such as for example the holding contact st2 which then causes excitation of the relay STK.

When the relays P1 and P2 have become deenergized and the relay 3P is still in energized condition (third phase corresponding to the time 113—114 of FIG. 8) the kilogram value "7" is recorded. In fact, during such interval of time (FIG. 11) the contact st1 of the relay ST, the contact 2p4 of the relay 2P and the contact 3p4 of the relay 3P are closed.

Figures 10, 11:
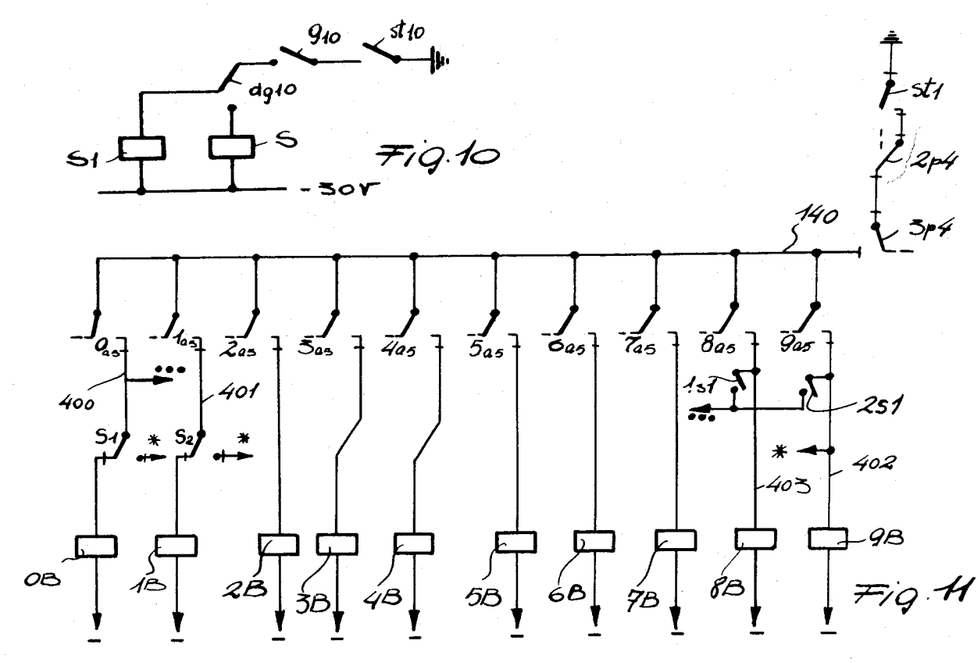
FIG. 10 is a detail of a correcting circuit.
FIG. 11 shows the detail of the circuit of the relays which in the recording machine control the stamping or printing of the indications furnished by the indicator.

Thus the bus bar lead 140 is earthed which, through the working contact 7a5 of the relay 7A (excited) feeds the relay 7B which causes stamping or printing of the value "7."

When the dropping-off time of 3P is terminated that is to say, at the point 114 of the diagram of FIG. 8, the blocking relay SB is excited and this causes the opening of the contact sb1 arranged in series with the relay F and hence, finally the de-energisation of said relay.

Opening of the contact sb2 located on the lead 1x is also obtained and therefore de-energisation of the relay 7A.

The de-energisation of the relay F involves the closing of the normally closed contact f2 which feeds the relay 1P and therefore causes excitation of the latter and, in succession, of the relays 2P and 3P (see points 180 and 181 of the diagram shown in FIG. 8). The relay 3P is excited and opens therefore the contact 3p3 which feeds SB, which is thus de-energised (see point 118 of the diagram in FIG. 8) closing the contact sb1 in series with the relay F. The relay F is excited and therefore opens its contact f2 located in the circuit of the relay 1P (point 105 in FIG. 8) which begins to become deenergized.

This concludes the second operation and begins the third, consisting in the phases of re-reading and recording the hectogram value indicated by the position of the indicator.

Operation of Re-Reading, Re-Identification and Recording of the Indicated Hectogram Value According to modifications which will be described hereinafter the bi-stable circuit arrangement shown in FIG. 6 now causes, as a consequence of the switching of the contacts sb3 and sb4, due to the excitation of the relay SB, excitation of the relay G and therefore closing of the respective contacts, indicated by g.

A closing of the contacts f1, 1p1, and g2 of FIG. 9 applies a negative potential to the lead 107, which causes, as described on the occasion of the first operation, the simultaneous appearance of a signal on the leads $1_6$, $1_7$, $1_8$ which are associated with the winding turns assigned to hectograms and influenced in the particular case by the magnetic field of cores 9. At the point 110 (see FIG. 8), that is to say upon the termination of the period of de-energization of the relay 1P, the normally open contact 1p1 of FIG. 9 opens, therefore the signal applied to the leads $1_6$, $1_7$ and $1_8$ disappears and only the relay A8 remains excited. Excitation of said relay produces closing of the contact 8a5 of FIG. 11. Since the relay ST is excited and its contact st1 is in closed position, and since the relay 2P is deenergized while 3P is alone in the course of being de-energized, the closing of the circuit takes place which goes from earth through the contact 8a5 of the excited relay 8A, to the relay 8B which causes the stamping or printing of the numerical value "8."

When the period of deenergization of the relay 3P has passed, that is to say at the point 114 of FIG. 8, excitation of the relay SB and therefore de-energisation of the relay F take place.

This concludes the third operation and the apparatus according to the present invention is put into idle position by means of the by-stable circuit arrangement of FIG. 6 which causes excitation of the relay FI which produces opening of its contact fi1 of FIG. 7, arranged in series with the starter relay AV. The circuit is thus in a condition of rest.

As already stated above, the above three operations are controlled by the bi-stable circuit arrangement illustrated in FIG. 6, composed of two flip-flops indicated by 200 and 201. Such flip-flop circuits act on a group of relays G, D, FI in the order G, D, G, D, FI, that is to say they excite such relays successively first in direct sequence and then in the reverse sequence. During the excitation of the relay G, in the course of the direct sequence, the first of the two operations described above takes place which concludes with the memorizing of the hectogram value indicated by the indicator, whilst excitation of the relay D which operates in the second operation, that is to say, after the memorizing, controls the recording of the kilogram value indicated by the indicator; the third operation, concluding with the recording of the hectogram value indicated on the scale, takes place in the reverse sequence of excitation, that is to say with excitation of the relay G, after excitation of the relay D. Finally, after excitation of the relay G excitation of the relay FI takes place, which may be called the terminating relay, the action of which causes the de-energization of the starter relay AV, and therefore terminates the operation of the described circuit.

The bi-stable circuit arrangement shown in FIG. 6 is constructed and operates as follows:

Supposing that the transistor 202 is conductive and that the contacts are all in the position shown in the figure. If the relay 202 is conductive, the point 203 has a potential substantially equal to that of the point 204 where the two emitter leads of the two transistors 202 and 205 meet and which point is earthed through the resistor 206. Due to the powerful current which passes through the transistor 202 the point 204 is negative relatively to earth and so is the emitter of the transistor 205 which is negative with regard to its own base which is connected to earth through the resistor 207 and to the −30 volt lead through the resistors 208 and 209. Due to the fact that the base is less negative than the emitter, the transistor 205 is blocked whereby at 210 there is a powerful negative potential which keeps the base of the transistor 202 negative which is connected, on the one hand, to earth through the resistor 211 and, on the other hand, to the −30 volt lead through the resistors 212 and 213. The transistor 202, however, has the emitter at positive potential with respect to the base (provided that the resistors are suitably dimensioned with respect to each other) and is therefore conductive.

It is now assumed that the starter push button aw is depressed and the relay AH is consequently excited, its contact ah1, which is connected to earth potential, is connected to the base of the transistor 202 downstream of the resistor 211. This involves the blocking of the transistor 202, because its base becomes less negative than the appropriate emitter. By the blockage of said transistor, the point 203 receives negative potential so that the base of the transistor 205 becomes more negative than the appropriate emitter. As a result of this the relay G is excited through the contact ah2 (having closed with excitation of the relay AH).

Excitation of the relay G causes the closing of the normally open contacts g5 and g6. The closing of the contact g5 applies positive potential to the transistor 300, the emitter of which connected to earth through the resistor 301 is less negative than the respective base which is connected, on one side, to the −30 volt lead through the two resistors 302 and 303 and on the other side to earth through the resistor 304.

The transistor 305 is, on the other hand, blocked, because its base is more positive than its emitter, being connected through ah2 and g5 to the conductive transistor 205. The base of the transistor 305 is earthed through the resistor 306 and connected to the −30 volt lead through the resistors 307 and 308. The relay G is therefore kept excited through the transistor 300 even after the contacts ah1 and ah2 have opened to de-energize the the corresponding relay AH. When the process of memorizing the hectogram value (see point 105 of FIG. 8) is concluded excitation of the blocking relay SB takes place and therefore also the switching of the contacts sb3 and sb4, the former applying a negative potential to the base of the transistor 202 causing it to become conductive and the latter applying positive potential to the base of the transistor 205 thereby blocking it. Consequently, excitation takes place through the transistor 202 of the relay D because the normally open contact g6 is closed (G still being excited through 300) and the contact 1st is in the position shown in the figure, the corresponding relay STK not yet being excited. When the switching of the contact 1st of the relay STK takes place, the relay D remains excited through its own contact d4, the transistor 305 now being conductive because its base is more negative than the respective emitter. The transistor 300 is blocked however. At the conclusion of the second operation, which terminates with the recording of the indicated kilogram value, the contacts sb3 and sb4 apply potential respectively to the bases of the two transistors 205 and 202, thereby rendering 205 conductive which, through the normally open contact d5 and 2nd, now both closed, effects excitation of the relay G which initiates the third operation which concludes with the recording of the indicated hectogram value. The relay G is kept excited through the closed contact g5 and the transistor 300 which is now conductive. At the conclusion of this operation, the switching of the contacts sb3 and sb4 takes place and the conversion of the conductivity of the two transistors 202 and 205, by which the relay FI is fed through the now closed contact g6, and the contact 1st which is switched to its second position by excitation of the relay STK. Excitation of the relay FI effects closing of the contacts fi, so that the starter relay AV is de-energized, and also dropping-off and de-energization of the same relay FI, which is connected, in parallel with the resistor-condenser series-combination, indicated by 400 and 401. The delay effected thereby serves to ensure that all the relays have come into a condition of rest. This concludes the reverse sequence and the circuit reaches a condition of rest.

The invention also provides a compensation circuit, illustrated in FIGS. 10 and 11. Such a compensation circuit is necessary when, after the apparatus is started by depressing the push button *aw*, the indicator of the weighing machine and, therefore, the cores 9 associated therewith, are displaced along the scale by vibrations, due, for example, to the shaking of the base of the weighing machine during the passing of a vehicle or the like in the vicinity of the weighing machine. In order to make clear the reasons for the necessity of such an arrangement, the following possible case may be referred to: Assuming that the push-button *aw* has been depressed at the moment when on the stationary indicator scale "9" hectograms are indicated: if the passing of a vehicle then causes shaking of the weighing machine, a displacement of the moving indicator 7 to the position indicating 1.1 kg. may occur and, if this should happen during the phase of recording the hectograms, the recording device would print 0.1 kilogram, an obviously incorrect indication. To avoid such disadvantage, the solution shown in FIGS. 10 and 11 is given and will now be described. In the course of the first operation, which terminates with the memorizing of the hectogram value indicated by the indicator, that is to say, of the hectogram value "9," excitation of the relay DG causes the switching of the contact *dg*10 and, since the contact *g*10 and the contact *st*10 of the relay ST are closed, excitation of the relay S takes place and, hence, the switching its contacts *s*1 and *s*2 from the leads 400 and 401 associated with the values 0 and 1 to the lead 402 associated with the value "9." It follows that if the indicator is brought by a vibration due to any cause, to the value 0 or 1, the indication of such values will not be recorded, but that of the value 9. The printed value is therefore the exact one, independently of the small vibrations which the indicator of the weighing machine may give by reason of such movements due to various causes, for example, shaking, passage of vehicles and the like.

The opposite happens if the indicator reaches a position wherein it shows the hectogram value "0" (signal on lead 400), and if due to disturbed equilibrium the indicator is displaced in the course of the third operation (which concludes with the recording of the value of the indicated hectogram) to indicating hectograms "9" or "8" on the scale. In this case the relay S1 intervenes and switches the corresponding contacts 1*s*1 and 2*s*1 from the leads 402 and 403 to the lead 400 associated with "0" causing the printing of this value which is correct, as shown by the indicator of the weighing machine at the moment in which the starter push button *aw* is depressed.

Since only one embodiment has been described by way of example, it will now be easy for a person skilled in the art to think of numerous variations or modifications of the described solution, without departing from the scope and gist of the present invention as claimed.

Thus, for example, the weighing machine may be easily transformed in such manner as to have a maximum weighing capacity appreciably greater than that of 10 kilograms used in the present description by way of example. For this purpose, in parallel with the relay DG, a series of similar relays may also be provided adapted to effect the pre-selection of a value of a consecutively greater order of magnitude. Furthermore, in the bi-stable circuit arrangement of FIG. 6, in parallel with the relay G, a relay may be provided intended to indicate, for example, tens of kilograms and in parallel to the relay D a relay intended for the quintals; in this case the bi-stable circuit arrangement will produce excitation in direct sequence of these various relays starting from the relay G and then excitation in the reverse sequence of the same relays to terminate on the final relay FI.

In addition, in parallel with the leads 107 and 130, other leads may be provided for blocking pre-amplifier groups similar to those of FIG. 4, but associated to tens and hundreds of kilograms.

According to an additional characteristic of the present invention, to avoid the field produced by magnetization of the cores 9 of the indicator 6 influencing two consecutive turns (for example the turns 12*a*, 12*b*, of FIG. 2) appertaining to one winding, five of the windings are provided to be energized by the current in one direction and five in the opposite direction and such turns are interposed along the scale of the weighing machine. In other words, along the windings assigned to hectograms, five turns are provided in one direction spaced from one another by an amount equal to the spacing of two kilograms on the scale and along the same windings, the same number of turns are provided in reverse direction spaced apart amounts equal to the spacing of two kilograms and interposed between the preceding turns, as shown in FIG. 2.

What is claimed is:

1. A weighing machine having electrically energizable recording means for recording the result of a weighing operation, comprising, in combination, a stationary reference member subdivided into different areas respectively associated with different weights; mechanical indicator means movable between a plurality of positions along said reference member, said different positions individually corresponding to said different areas associated with different weights that may be established as result of a weighing operation; a source of alternating voltage; electric indicator means including magnetic field producing means operatively connected with said source for being energized thereby and mounted on said mechanical indicator means in a position to be moved by the latter along said stationary reference member; and signal producing means including a plurality of induction coil means arranged along said stationary reference member in different positions respectively corresponding to said different areas thereof associated with different weights for being selectively energized inductively by said field producing means when the latter are in any position of said mechanical indicator means located substantially opposite at least a portion of any of said induction coil means and for issuing in such position corresponding to a weight established by a weighing operation an energizing signal representing such weight to the recording means.

2. Weighing machine according to claim 1, wherein said source is a multivibrator and wherein induction means are provided for connecting said field producing means inductively to said multi-vibrator.

3. Weighing machine according to claim 2, wherein said induction means comprise a primary winding rigidly connected to a stationary portion of the weighing machine and a secondary winding rigidly connected to said mechanical indicator means, the latter being rotatable about a stationary axis, said secondary winding participating therefore in the movement of said mechanical indicator means, said primary and secondary windings being concentrically disposed relatively to the axis of rotation of said mechanical indicator means and inductively coupled with each other.

4. Weighing machine according to claim 1, wherein said mechanical indicator means comprises at least one magnetizable core extension, and wherein said field producing means include at least one inductor winding mounted on said core extension for magnetizing the latter and for producing thereby a magnetic field.

5. Weighing machine according to claim 1, wherein said plurality of induction coil means arranged along said stationary reference member comprises a first group of as many of said coils as there are main category weight units to be indicated, and a second group of said coils corresponding in number to that number of at least one type of sub-category weight units of the unit system employed which would constitute a main category unit, said different coils of said first group being respectively associated with different integer multiples of said main category unit, and said different coils of said second group being associated with different integer multiples, respectively, of said sub-category weight unit, each of said coils of said second group including a plurality of turns connected in series with each other and arranged in positions spaced from each other equally a distance corresponding on said reference member to a distance between areas associated with two consecutive integer multiples of said main category weight unit.

References Cited in the file of this patent

UNITED STATES PATENTS

| | | |
|---|---|---|
| 2,880,985 | Roberts | Apr. 7, 1959 |
| 2,948,464 | Allen | Aug. 9, 1960 |